United States Patent
Ohmi (10) Patent No.: US 10,001,503 B2
(45) Date of Patent: Jun. 19, 2018

(54) ROTATION SENSOR (71) Applicant: DENSO CORPORATION, Kariya, Aichi-pref. (JP)

(72) Inventor: Tetsuya Ohmi, Kariya (JP)

(73) Assignee: DENSO CORPORATION, Kariya (JP)

(*) Notice: Subject to any disclaimer, the term of this patent is extended or adjusted under 35 U.S.C. 154(b) by 214 days.

(21) Appl. No.: 14/904,818

(22) PCT Filed: Jul. 14, 2014

(86) PCT No.: PCT/JP2014/003708
§ 371 (c)(1),
(2) Date: Jan. 13, 2016

(87) PCT Pub. No.: WO2015/008472
PCT Pub. Date: Jan. 22, 2015

(65) Prior Publication Data
US 2016/0231346 A1  Aug. 11, 2016

(30) Foreign Application Priority Data

Jul. 16, 2013 (JP) ................. 2013-147713
Feb. 5, 2014 (JP) ................. 2014-020694

(51) Int. Cl.
*G01P 3/48* (2006.01)
*G01P 3/487* (2006.01)
(Continued)

(52) U.S. Cl.
CPC ............ *G01P 3/487* (2013.01); *G01D 5/2451* (2013.01); *G01P 3/481* (2013.01); *G01P 3/488* (2013.01); *G01P 3/489* (2013.01)

(58) Field of Classification Search
CPC .......... G01P 3/487; G01P 3/489; G01P 3/488; G01D 5/2451
See application file for complete search history.

(56) References Cited

U.S. PATENT DOCUMENTS 4,908,572 A * 3/1990 Sakai ................. G01D 5/2451
324/173
6,218,870 B1   4/2001 Wilson
(Continued)

FOREIGN PATENT DOCUMENTS

JP   2004-194124 A   7/2004
JP   2006-032854 A   2/2006
(Continued)

OTHER PUBLICATIONS

International Search Report of the International Searching Authority dated Oct. 7, 2014 issued in the corresponding International application No. PCT/JP2014/003708 (and English translation).
(Continued)

*Primary Examiner* — Tung X Nguyen
*Assistant Examiner* — Dominic Hawkins
(74) *Attorney, Agent, or Firm* — Posz Law Group, PLC (57) ABSTRACT

A rotation sensor has a magnetoelectric conversion unit that converts change of magnetic flux whose direction changes periodically with rotation of a rotator into an electric signal and a processing unit that processes the electric signal. The magnetoelectric conversion unit outputs a first detection signal and a second detection signal. The processing unit has a first comparison unit that compares a detection threshold and the first detection signal and a second comparison unit that compares a reference threshold and the second detection signal. The first comparison unit changes a voltage level of the detection threshold when the first detection signal exceeds or falls below the detection threshold and then restores the voltage level of the detection threshold based on the second detection signal and the reference threshold, and the first comparison unit converts the first detection signal into a pulse signal based on the detection threshold of the same voltage level.

17 Claims, 7 Drawing Sheets (51) Int. Cl.
*G01P 3/481* (2006.01)
*G01P 3/488* (2006.01)
*G01P 3/489* (2006.01)
*G01D 5/245* (2006.01)

(56) References Cited

U.S. PATENT DOCUMENTS

| | | | | |
|---|---|---|---|---|
| 7,138,793 | B1 * | 11/2006 | Bailey | G01D 5/14 324/207.12 |
| 8,446,146 | B2 * | 5/2013 | Foletto | G01D 5/24452 324/207.13 |
| 2004/0145364 | A1 * | 7/2004 | Onishi | G01D 5/04 324/207.2 |
| 2005/0162207 | A1 | 7/2005 | Kamei | |
| 2010/0013467 | A1 * | 1/2010 | Hara | G01B 7/30 324/207.25 |
| 2010/0026279 | A1 * | 2/2010 | Vig | G01P 3/488 324/173 |
| 2010/0225308 | A1 | 9/2010 | Kurumado et al. | |
| 2011/0246133 | A1 * | 10/2011 | Harada | G01D 5/145 702/151 |
| 2012/0105055 | A1 * | 5/2012 | Takahashi | F16C 41/007 324/207.25 |

FOREIGN PATENT DOCUMENTS

| | | |
|---|---|---|
| JP | 2007-132706 A | 5/2007 |
| JP | 2008-020443 A | 1/2008 |
| WO | 2009/090996 A1 | 7/2009 |

OTHER PUBLICATIONS

Written Opinion of the International Searching Authority dated Oct. 7, 2014 issued in the corresponding International application No. PCT/JP2014/003708 (and English translation).

* cited by examiner

ROTATION SENSOR

CROSS-REFERENCE TO RELATED APPLICATIONS

The present disclosure is a U.S. national stage of International Application No. PCT/JP2014/003708 filed on Jul. 14, 2014 and is based on Japanese Patent Application No. 2013-147713 filed on Jul. 16, 2013 and Japanese Patent Application No. 2014-20694 filed on Feb. 5, 2014, the disclosures of which are incorporated herein by reference.

TECHNICAL FIELD

The present disclosure relates to a rotation sensor for detecting the rotation state of a rotator based on the change of magnetic flux whose direction changes periodically with the rotation of the rotator.

BACKGROUND ART

Conventionally, there has been proposed a hysteresis comparator circuit as described in, for example, Patent Literature 1. It can be considered that the hysteresis comparator circuit is used to convert, into a pulse signal, an output signal of a magnetoelectric conversion element for converting the change of magnetic flux whose direction changes periodically with the rotation of the rotator into an electric signal. The hysteresis comparator circuit converts the output signal of the magnetoelectric conversion element into the pulse signal, based on the large/small relationship between a threshold and the output signal of the magnetoelectric conversion element.

PRIOR ART LITERATURE

Patent Literature

[Patent Literature 1] JP 2004-194124 A

SUMMARY OF INVENTION

The hysteresis comparator circuit has two thresholds, between which the threshold changes depending on the change of an input signal from the magnetoelectric conversion element. More specifically, when the voltage level of the input signal exceeds a threshold (hereinafter referred to as a first threshold), the threshold is set to a threshold of a lower voltage level (hereinafter referred to as a second threshold). When the voltage level of the input signal falls below the second threshold, the threshold is reset to the first threshold. This prevents the pulse signal from containing an extra pulse caused by noise overlapped on the input signal.

In the above configuration, in the case of converting the input signal into a pulse signal that has a pulse rising edge when the input signal exceeds the first threshold and has a pulse falling edge when the input signal falls below the second threshold; due to the difference in voltage level between the first threshold and the second threshold, the accuracy of the pulse signal is decreased. Therefore, it is not possible to control the rotation state of the rotator with high accuracy.

Accordingly, to avoid the decrease in accuracy, there can be conceived a configuration for converting the input signal into a pulse signal that has a pulse rising edge when the input signal exceeds the first threshold and has a pulse falling edge when the input signal again exceeds the first threshold. However, for example, in the case where magnetic flux varies periodically with the rotation of equally-spaced projections formed on the circumference of the rotator and depressions therebetween, the number of pulses contained in the pulse signal is equal to the number of projections. Therefore, in the case of application to the rotator of a small number of projections, the number of pulses contained in the pulse signal is decreased. Therefore, it is not possible to control the rotation state of the rotator with high accuracy.

In view of the above problems, it is therefore an object of the present disclosure to provide a rotation sensor by which the decrease in the accuracy of the pulse signal is suppressed and the number of pulses contained in the pulse signal is increased.

According to a first aspect of the present disclosure, a rotation sensor that detects a rotation state of a rotator based on change of magnetic flux whose direction changes periodically with rotation of the rotator has a magnetoelectric conversion unit that converts change of magnetic flux whose direction changes periodically into an electric signal and a processing unit that processes the electric signal of the magnetoelectric conversion unit. The magnetoelectric conversion unit outputs, as the electric signal, a first detection signal and a second detection signal having the same period and different phases. The processing unit has a first comparison unit that generates a detection threshold and compares the detection threshold and the first detection signal and a second comparison unit that generates a reference threshold and compares the reference threshold and the second detection signal. The second detection signal acts to fall below or exceed the reference threshold only once during a period from a time the first detection signal exceeds the detection threshold to a time the first detection signal falls below the detection threshold and during a period from a time the first detection signal falls below the detection threshold to a time the first detection signal exceeds the detection threshold. The first comparison unit changes a voltage level of the detection threshold when the first detection signal exceeds or falls below the detection threshold, restores the voltage level of the detection threshold when the second detection signal falls below or exceeds the reference threshold only once, and changes the voltage level of the detection threshold when the first detection signal falls below or exceeds the detection threshold of the same voltage level. The first comparison unit converts the first detection signal into a pulse signal that has a pulse rising edge when the first detection signal exceeds the detection threshold and has a pulse falling edge when the first detection signal falls below the detection threshold of the same voltage level.

According to the above configuration, to suppress a malfunction caused by noise overlapped on the first detection signal, the voltage level of the detection threshold is changed when the first detection signal exceeds or falls below the detection threshold. Further, the voltage level of the detection threshold is restored based on the second detection signal and the reference threshold, and the first detection signal is converted into the pulse signal based on the detection threshold of the same voltage level. More specifically, the first detection signal is converted into the pulse signal that has the pulse rising edge when the first detection signal exceeds the detection threshold and has the pulse falling edge when the first detection signal falls below the detection threshold of the same voltage level.

Thus, unlike the configuration for converting the first detection signal into the pulse signal that has the pulse rising edge when the first detection signal exceeds the detection threshold and has the pulse falling edge when the first detection signal falls below the detection threshold of a different voltage level, the decrease in the accuracy of the pulse signal is suppressed. Further, in comparison with the configuration for converting the first detection signal into the pulse signal that has the pulse rising edge when the first detection signal exceeds the detection threshold and has the pulse falling edge when the first detection signal again exceeds the detection threshold, the number of pulses contained in the pulse signal is increased. More specifically, the number of pulses is doubled.

According to a second aspect of the present disclosure, a rotation sensor that detects a rotation state of a rotator based on change of magnetic flux whose direction changes periodically with rotation of the rotator has a magnetoelectric conversion unit that converts change of magnetic flux whose direction changes periodically into an electric signal and a processing unit that processes the electric signal of the magnetoelectric conversion unit. The magnetoelectric conversion unit outputs, as the electric signal, a first detection signal and a second detection signal having the same waveform and amplitude and having a phase difference of 90 degrees. The processing unit has a first comparison unit that generates a first detection threshold and compares the first detection threshold and the first detection signal, a second comparison unit that generates a second detection threshold and compares the second detection threshold and the second detection signal, and a combination unit that combines respective signals outputted from the first comparison unit and the second comparison unit. The second detection signal acts to fall below or exceed the second detection threshold only once during a period from a time the first detection signal exceeds the first detection threshold to a time the first detection signal falls below the first detection threshold and during a period from a time the first detection signal falls below the first detection threshold to a time the first detection signal exceeds the first detection threshold. The first comparison unit changes a voltage level of the first detection threshold when the first detection signal exceeds or falls below the first detection threshold, restores the voltage level of the first detection threshold when the second detection signal falls below or exceeds the second detection threshold only once, and changes the voltage level of the first detection threshold when the first detection signal falls below or exceeds the first detection threshold of the same voltage level. The first comparison unit converts the first detection signal into a first pulse signal that has a pulse rising edge when the first detection signal exceeds the first detection threshold and has a pulse falling edge when the first detection signal falls below the first detection threshold of the same voltage level. The first detection signal acts to exceed or fall below the first detection threshold only once during a period from a time the second detection signal exceeds the second detection threshold to a time the second detection signal falls below the second detection threshold and during a period from a time the second detection signal falls below the second detection threshold to a time the second detection signal exceeds the second detection threshold. The second comparison unit changes a voltage level of the second detection threshold when the second detection signal exceeds or falls below the second detection threshold, restores the voltage level of the second detection threshold when the first detection signal falls below or exceeds the first detection threshold only once, and changes the voltage level of the second detection threshold when the second detection signal falls below or exceeds the second detection threshold of the same voltage level. The second comparison unit converts the second detection signal into a second pulse signal that has a pulse rising edge when the second detection signal exceeds the second detection threshold and has a pulse falling edge when the second detection signal falls below the second detection threshold of the same voltage level. The combination unit generates a combination signal containing pulses that have pulse falling edges or rising edges at rising and falling edges of pulses contained in the first pulse signal and the second pulse signal and have a pulse width set to a predetermined value.

BRIEF DESCRIPTION OF DRAWINGS

The above and other objects, features, and advantages of the present disclosure will become more apparent from the following detailed description made with reference to the accompanying drawings, in which.

DESCRIPTION OF EMBODIMENTS

Hereinafter, embodiments of the present disclosure will be described with reference to the drawings.

First Embodiment

A rotation sensor according to this embodiment will be described with reference to FIGS. 1 to 4. In a timing chart of FIG. 4, the vertical axis represents voltage, and the horizontal axis represents time. Hereinafter, a direction passing through a rotation center RC of the rotator 200 in one direction is an axial direction, and a direction around the axial direction is a circumferential direction.

Figure 1:
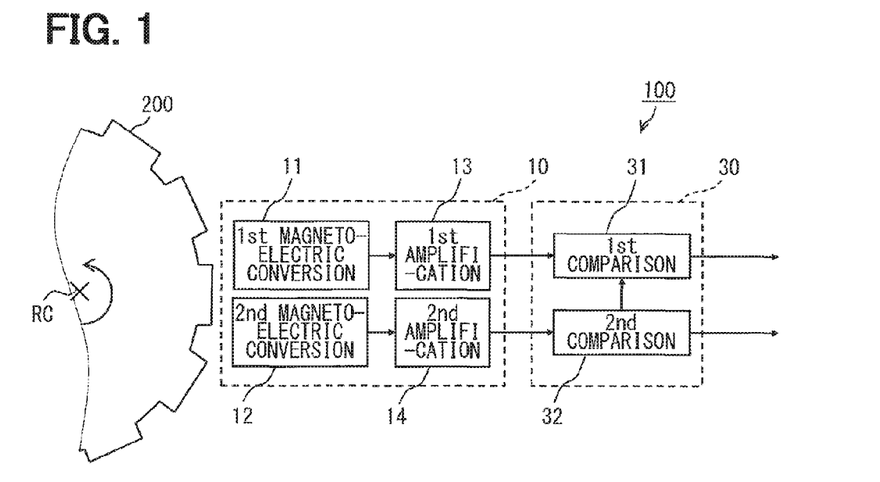
FIG. 1 is a block diagram showing a schematic configuration of a rotation sensor according to a first embodiment of the present disclosure.

The rotation sensor 100 detects the rotation state of the rotator 200 based on the change of magnetic flux whose direction changes periodically with the rotation of the rotator 200. As shown in FIG. 1, the rotation sensor 100 has a magnetoelectric conversion unit 10 for converting the change of magnetic flux whose direction changes periodically into an electric signal and a processing unit 30 for processing the electric signal of the magnetoelectric conversion unit 10.

The magnetoelectric conversion unit 10 has a first magnetoelectric conversion unit 11 and a second magnetoelectric conversion unit 12. A first detection signal is outputted from the first magnetoelectric conversion unit 11, and a second detection signal is outputted from the second magnetoelectric conversion unit 12. On the other hand, the processing unit 30 has a first comparison unit 31 for generating a detection threshold and comparing the detection threshold and the first detection signal and a second comparison unit 32 for generating a reference threshold and comparing the reference threshold and the second detection signal.

The first comparison unit 31 converts the first detection signal into a pulse signal, based on the result of comparing the detection threshold and the first detection signal and the result of comparing the reference threshold and the second detection signal. The second comparison unit 32 converts the second detection signal into a pulse signal, based on the result of comparing the reference threshold and the second detection signal. The second detection signal is a reference signal used as a reference to convert the first detection signal into the pulse signal. The first detection signal that has been converted into the pulse signal is outputted as a detection signal indicating the rotation state of the rotator 200 to a control circuit (not shown) which is located in the subsequent stage and controls the rotation state of the rotator 200. The control circuit controls the rotator 200 based on the first detection signal that has been converted into the pulse signal.

The magnetoelectric conversion unit 10 has the first magnetoelectric conversion unit 11 and the second magnetoelectric conversion unit 12 as described above, and also has a magnetic field generation unit (not shown) for applying bias magnetic flux to the rotator 200 through the magnetoelectric conversion units 11, 12. Projections and depressions are formed at equal spaces along the circumferential direction on the surface of the rotator 200, and the bias magnetic field varies in accordance with the rotation of the projections and depressions. The magnetoelectric conversion units 11, 12 each convert the variation of the bias magnetic flux into the electric signal.

Although not shown, the magnetoelectric conversion units 11, 12 each have a plurality of magnetoresistance effect elements whose resistances vary in accordance with the direction of the passing bias magnetic flux and which constitute a bridge circuit. The middle point potential of each bridge circuit varies in accordance with the variation of the resistance values of the magnetoresistance effect elements. As described above, the first detection signal is outputted from the first magnetoelectric conversion unit 11, and the second detection signal is outputted from the second magnetoelectric conversion unit 12.

Figure 4:
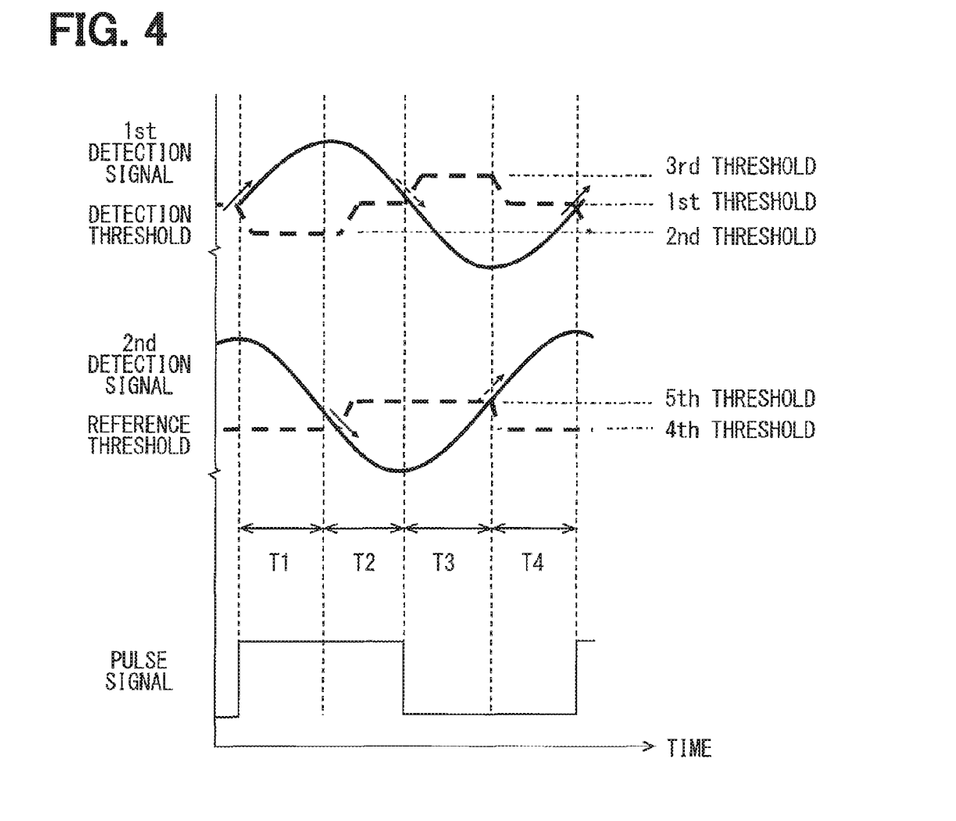
FIG. 4 is a timing chart showing detection signals, thresholds, and a pulse signal in the rotation sensor.

The first detection signal and the second detection signal have the same period and different phases. In this embodiment, the first detection signal and the second detection signal have the same amplitude and waveform, and are triangular waves. Further, the first detection signal and the second detection signal have a phase difference of 90 degrees. Therefore, if the first detection signal is a sine wave, the second detection signal is a cosine wave. As shown in FIG. 4, the second detection signal acts to fall below the reference threshold only once during a period from a time the first detection signal exceeds the detection threshold to a time the first detection signal falls below the detection threshold and exceed the reference threshold only once during a period from a time the first detection signal falls below the detection threshold to a time the first detection signal exceeds the detection threshold.

Further, the magnetoelectric conversion unit 10 has amplification units 13, 14 in addition to the above-described constituent elements 11, 12 and the magnetic field generation unit. The first detection signal amplified by the first amplification unit 13 is inputted to the processing unit 30, and the second detection signal amplified by the second amplification unit 14 is inputted to the processing unit 30.

As described above, the processing unit 30 has the first comparison unit 31 and the second comparison unit 32. The first comparison unit 31 changes the voltage level of the detection threshold when the first detection signal exceeds or falls below the detection threshold, restores the voltage level of the detection threshold when the second detection signal falls below or exceeds the reference threshold only once, and again changes the voltage level of the detection threshold when the first detection signal falls below or exceeds the detection threshold of the same voltage level. Further, the first comparison unit 31 converts the first detection signal into a pulse signal that has a pulse rising edge when the first detection signal exceeds the detection threshold and has a pulse falling edge when the first detection signal falls below the detection threshold of the same voltage level.

The second comparison unit 32 changes the voltage level of the reference threshold when the second detection signal exceeds or falls below the reference threshold, and changes the voltage level of the reference threshold to the original voltage level when the second detection signal falls below or exceeds the detection threshold of a different voltage level. Further, the second comparison unit 32 converts the second detection signal into a pulse signal that has a pulse rising edge when the second detection signal exceeds the reference threshold and has a pulse falling edge when the second detection signal again exceeds the reference threshold.

In this case, the second detection signal that has been converted into the pulse signal has a longer period than the first detection signal that has been converted into the pulse signal. As a matter of course, the second comparison unit 32 may convert the second detection signal into a pulse signal that has a pulse rising edge when the second detection signal exceeds the reference threshold and has a pulse falling edge when the second detection signal falls below the reference threshold. In this case, the voltage level of the reference threshold differs depending on whether the second detection signal exceeds or falls below the reference threshold. Therefore, the second detection signal that has been converted into the pulse signal has a lower accuracy than the first detection signal that has been converted into the pulse signal.

Figure 2:
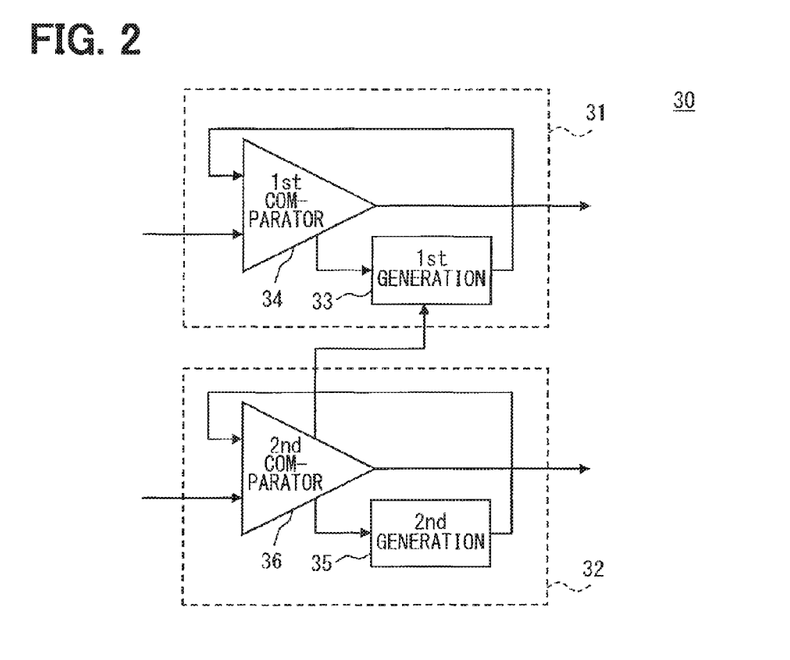
FIG. 2 is a block diagram showing a schematic configuration of a processing unit of the rotation sensor.
Figure 3A:
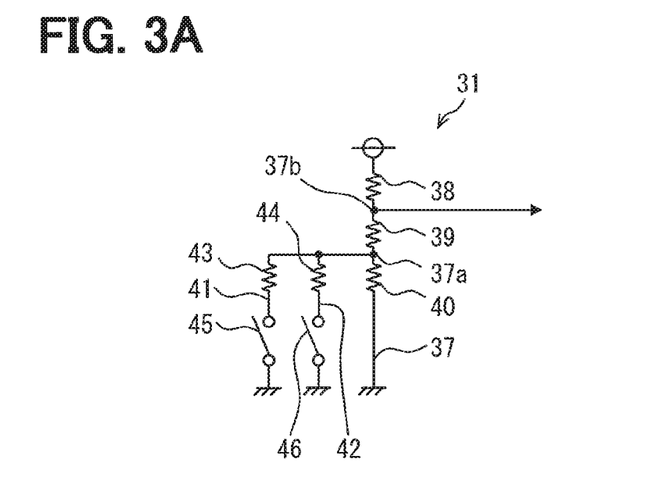
FIG. 3A is a circuit diagram showing an equivalent circuit of a first comparison unit of the processing unit.
Figure 3B:
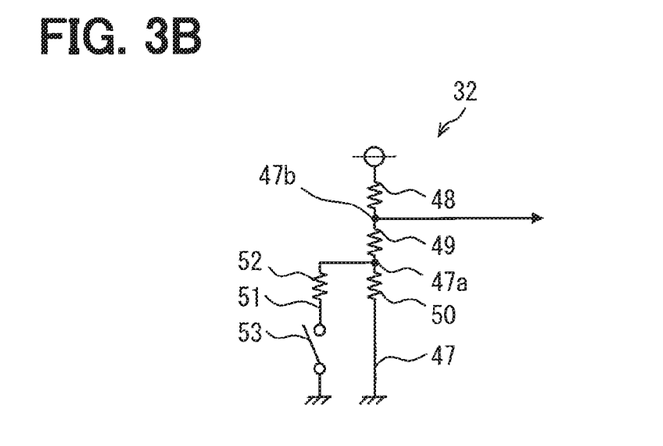
FIG. 3B is a circuit diagram showing an equivalent circuit of a second comparison unit of the processing unit.

The comparison units 31, 32 are Schmitt trigger circuits in the concrete, and FIGS. 2, 3A, and 3B show their equivalent circuits. As shown in FIG. 2, the first comparison unit 31 has a first generation unit 33 for generating the detection threshold and a first comparator 34 for comparing the first detection signal and the detection threshold. The second comparison unit 32 has a second generation unit 35 for generating the reference threshold and a second comparator 36 for comparing the second detection signal and the reference threshold.

As shown more specifically in FIG. 3A, the first comparison unit 31 has a first power source wiring line 37 for connecting a power source and a ground and three first power source resistors 38 to 40 connected in series with the first power source wiring line 37. Further, the first comparison unit 31 has two first ground wiring lines 41, 42 for connecting a first middle point 37a, located on the ground side, of two middle points constituted by the three first power source resistors 38 to 40 and the ground and first ground resistors 43, 44 provided respectively on the first ground wiring lines 41, 42.

In the first comparison unit 31, the potential of a second middle point 37b, located on the power source side, of the two middle points is the detection threshold, and the first comparison unit 31 has a first switch 45 provided on the first ground wiring line 41 and a second switch 46 provided on the first ground wiring line 42, as detection switches for determining the detection threshold. The potential of the second middle point 37b, that is, the detection threshold is switched in accordance with the respective driven states of the switches 45, 46. The driven state of the first switch 45 is controlled in accordance with whether the voltage level of the first detection signal falls below or exceeds the detection threshold, and the driven state of the second switch 46 is controlled in accordance with whether the voltage level of the second detection signal falls below or exceeds the reference threshold.

The detection threshold includes a first threshold, a second threshold lower in voltage level than the first threshold, and a third threshold higher in voltage level than the first threshold. In this embodiment, the first ground resistors 43, 44 have the same resistance value. If one of the first switch 45 and the second switch 46 is in the driven state and the other is in the undriven state, the detection threshold is set to the first threshold. If both the first switch 45 and the second switch 46 are in the driven state, the detection threshold is set to the second threshold. If both the first switch 45 and the second switch 46 are in the undriven state, the detection threshold is set to the third threshold.

Similarly, as shown more specifically in FIG. 3B, the second comparison unit 32 has a second power source wiring line 47 for connecting the power source and the ground and three second power source resistors 48 to 50 connected in series with the second power source wiring line 47. Further, the second comparison unit 32 has a second ground wiring line 51 for connecting a third middle point 47a, located on the ground side, of two middle points constituted by the three second power source resistors 48 to 50 and the ground and a second ground resistor 52 provided on the second ground wiring line 51.

In the second comparison unit 32, the potential of a fourth middle point 47b, located on the power source side, of the two middle points is the reference threshold, and the second comparison unit 32 has a third switch 53 provided on the second ground wiring line 51, as a reference switch for determining the reference threshold. The potential of the fourth middle point 47b, that is, the reference threshold is switched in accordance with the driven state of the third switch 53. The driven state of the third switch 53 is controlled in accordance with whether the voltage level of the second detection signal falls below or exceeds the reference threshold.

The reference threshold includes a fourth threshold and a fifth threshold higher in voltage level than the fourth threshold. If the third switch 53 is in the driven state, the reference threshold is set to the fourth threshold. If the third switch 53 is in the undriven state, the reference threshold is set to the fifth threshold.

Hereinafter, the respective shifts of the detection threshold and the reference threshold are described with reference to FIG. 4. In the initial state, the detection threshold is set to the first threshold in the first comparison unit 31, and the reference threshold is set to the fourth threshold in the second comparison unit 32. The first switch 45 is in the undriven state, and the switches 46, 53 are in the driven state.

As described above, the first detection signal and the second detection signal have a phase difference of 90 degrees; therefore, if the first detection signal is a sine wave, the second detection signal is a cosine wave. Hereinafter, T1 denotes a first time period during which the first detection signal moves from an intermediate value between a peak value and a bottom value to the peak value and the second detection signal moves from the peak value to the intermediate value. T2 denotes a second time period during which the first detection signal moves from the peak value to the intermediate value and the second detection signal moves from the intermediate value to the bottom value. T3 denotes a third time period during which the first detection signal moves from the intermediate value to the bottom value and the second detection signal moves from the bottom value to the intermediate value. Lastly, T4 denotes a fourth time period during which the first detection signal moves from the bottom value to the intermediate value and the second detection signal moves from the intermediate value to the peak value.

At the beginning of the first time period T1, the voltage level of the first detection signal exceeds the first threshold, as shown by a solid right-upward arrow in FIG. 4. The first comparison unit 31 brings the first switch 45 from the undriven state to the driven state and maintains the driven state of the second switch 46 in order to suppress a malfunction caused by noise overlapped on the first detection signal (occurrence of an adverse effect caused by containing an extra pulse in the pulse signal). Thus, the detection threshold is set from the first threshold to the second threshold.

At the beginning of the second time period T2, the voltage level of the second detection signal falls below the fourth threshold, as shown by a solid right-downward arrow in FIG. 4. The second comparison unit 32 brings the third switch 53 from the driven state to the undriven state in order to suppress a malfunction caused by noise overlapped on the second detection signal, thereby setting the reference threshold from the fourth threshold to the fifth threshold. Based on the comparison result of the second comparison unit 32, the first comparison unit 31 maintains the driven state of the first switch 45 and brings the second switch 46 from the driven state to the undriven state. Thus, the detection threshold is reset from the second threshold to the first threshold.

At the beginning of the third time period T3, the voltage level of the first detection signal falls below the first threshold, as shown by a dashed right-downward arrow in FIG. 4. The first comparison unit 31 brings the first switch 45 from the driven state to the undriven state and maintains the undriven state of the second switch 46 in order to suppress a malfunction caused by noise overlapped on the first detection signal. Thus, the detection threshold is set from the first threshold to the third threshold.

At the beginning of the fourth time period T4, the voltage level of the second detection signal exceeds the fifth threshold, as shown by a dashed right-upward arrow in FIG. 4. The second comparison unit 32 brings the third switch 53 from the undriven state to the driven state in order to suppress a malfunction caused by noise overlapped on the second detection signal, thereby resetting the reference threshold from the fifth threshold to the fourth threshold. Based on the comparison result of the second comparison unit 32, the first comparison unit 31 maintains the undriven state of the first switch 45 and brings the second switch 46 from the undriven state to the driven state. Thus, the detection threshold is reset from the third threshold to the first threshold.

Then, the above-described operations are repeated in the time periods T1 to T4. Thus, as shown in FIG. 4, the first comparison unit 31 converts the first detection signal into the pulse signal that has the pulse rising edge when the first detection signal exceeds the first threshold and has the pulse falling edge when the first detection signal falls below the first threshold.

Next, the operational effects of the rotation sensor 100 according to this embodiment will be described. As described above, to suppress a malfunction caused by noise overlapped on the first detection signal, the voltage level of the detection threshold is changed when the first detection signal exceeds or falls below the detection threshold. Further, the voltage level of the detection threshold is restored based on the second detection signal and the reference threshold, and the first detection signal is converted into the pulse signal based on the detection threshold of the same voltage level (first threshold). More specifically, the first detection signal is converted into the pulse signal that has the pulse rising edge when the first detection signal exceeds the first threshold and has the pulse falling edge when the first detection signal falls below the first threshold.

Thus, in the rotation sensor 100, unlike the configuration for converting the first detection signal into the pulse signal that has the pulse rising edge when the first detection signal exceeds the first threshold and has the pulse falling edge when the first detection signal falls below the second threshold different in voltage level from the first threshold, the decrease in the accuracy of the pulse signal is suppressed. Further, in comparison with the configuration for converting the first detection signal into the pulse signal that has the pulse rising edge when the first detection signal exceeds the first threshold and has the pulse falling edge when the first detection signal again exceeds the first threshold, the number of pulses contained in the pulse signal is increased. More specifically, the number of pulses is doubled.

In the example of this embodiment, the first detection signal and the second detection signal are triangular waves of the same amplitude and waveform, and have a phase difference of 90 degrees. However, it is sufficient if the first detection signal and the second detection signal have the same period and different phases. Further, it is sufficient if the second detection signal acts to fall below the reference threshold only once during a period from a time the first detection signal exceeds the detection threshold to a time the first detection signal falls below the detection threshold and exceed the reference threshold only once during a period from a time the first detection signal falls below the detection threshold to a time the first detection signal exceeds the detection threshold. Therefore, even though the first detection signal is a triangular wave, the second detection signal can be, for example, a pulse signal or a triangular wave.

In the example of this embodiment, the processing unit 30 has the first comparison unit 31 and the second comparison unit 32, and the comparison units 31, 32 are Schmitt trigger circuits. Further, FIGS. 2, 3A, and 3B show their equivalent circuits. In the example, the first comparison unit 31 has the switches 45, 46, and the second comparison unit 32 has the third switch 53. However, as long as the processing unit 30 has two Schmitt trigger circuits, either Schmitt trigger circuit may have the switches 45, 46, 53, While FIGS. 3A, 3B specifically show the equivalent circuits for changing the respective voltage levels of the detection threshold and the reference threshold, as a matter of course, the configuration for changing the respective voltage levels of the detection threshold and the reference threshold is not limited to this example, and the relationship among the resistance values of elements constituting the circuit is not limited. In the case of the circuit configuration shown in FIGS. 3A, 3B, the following is not limited as follows.

That is, in the example of this embodiment, the first comparison unit 31 has the three first power source resistors 38 to 40. However, the number of first power source resistors can be three or more.

In the example, the first comparison unit 31 has the two first ground wiring lines 41, 42. However, the number of first ground wiring lines can be two or more. Further, in the example, one first ground resistor is provided on one first ground wiring line. However, the number of first ground resistors provided on the first ground wiring line is not limited to the above example.

In the example of this embodiment, the second comparison unit 32 has the three second power source resistors 48 to 50. However, the number of second power source resistors can be three or more.

In the example of this embodiment, the second comparison unit 32 has the one second ground wiring line 51. However, the number of second ground wiring lines can be one or more. Further, in the example, one second ground resistor is provided on one second ground wiring line. However, the number of second ground resistors provided on the second ground wiring line is not limited to the above example.

Figure 5:
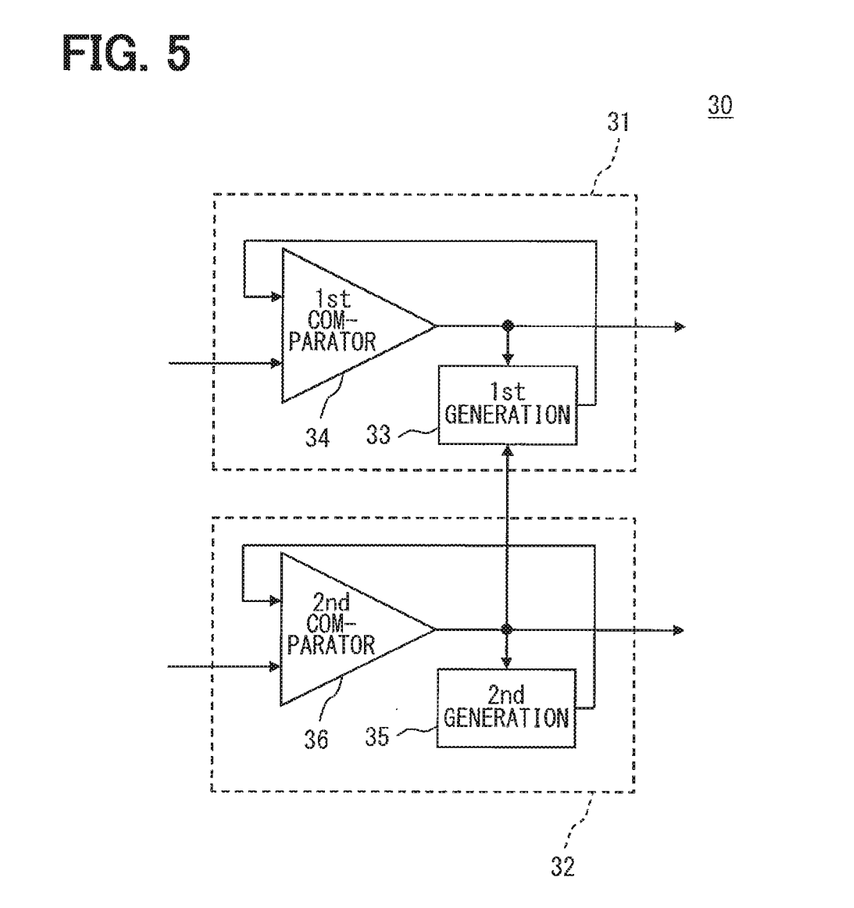
FIG. 5 is a block diagram showing a modification of the processing unit.

Lastly, in this embodiment, respective signals inputted to the switches 45, 46, 53 have not been described in particular. The signals for driving and controlling the switches 45, 46, 53 may be the internal signals of the two Schmitt trigger circuits as shown in FIG. 2, or may be the output signals of the Schmitt trigger circuits as shown in FIG. 5. In either case, the effects of this embodiment can be obtained.

Second Embodiment

Next, a second embodiment of the present disclosure will be described with reference to FIGS. 6 to 9. A rotation sensor according to the second embodiment has a lot in common with that of the above embodiment. Accordingly, hereinafter, common parts will not be described, and different parts will be intensively described. Further, hereinafter, the same elements as in the above embodiment are denoted by the same reference numerals.

Figure 6:
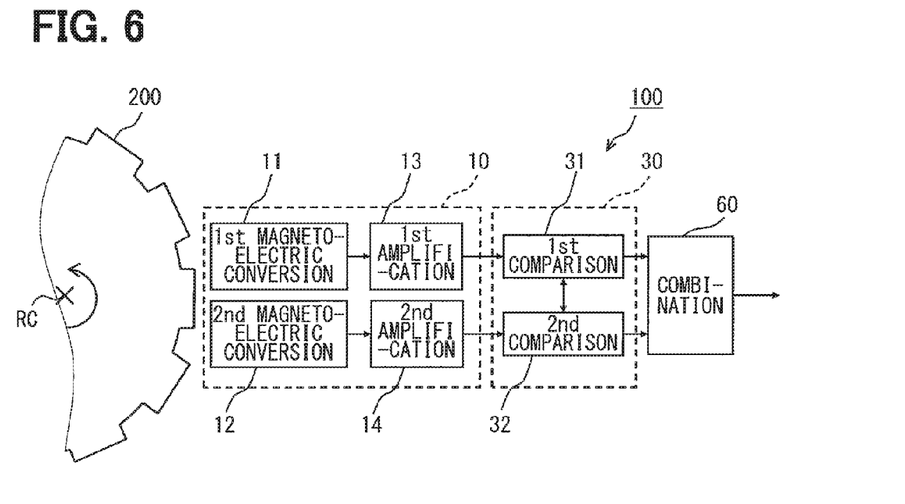
FIG. 6 is a block diagram showing a schematic configuration of a rotation sensor according to a second embodiment of the present disclosure.

Unlike the rotation sensor 100 according to the first embodiment, the rotation sensor 100 according to this embodiment has a combination unit 60 in addition to the magnetoelectric conversion unit 10 and the processing unit 30, as shown in FIG. 6. The magnetoelectric conversion unit 10 and the processing unit 30 have slightly different configurations from those of the rotation sensor 100 according to the first embodiment. Accordingly, the difference between the configurations and the combination unit 60 as a new constituent element will be sequentially described.

The magnetoelectric conversion unit 10 according to this embodiment also has the magnetoelectric conversion units 11, 12. The first detection signal is outputted from the first magnetoelectric conversion unit 11, and the second detection signal is outputted from the second magnetoelectric conversion unit 12. The first detection signal and the second detection signal have the same waveform and amplitude and have a phase difference of 90 degrees. In this embodiment as well, the first detection signal and the second detection signal are triangular waves. If the first detection signal is a sine wave, the second detection signal is a cosine wave.

In the example of the first embodiment, the second detection signal is the reference signal used as a reference to convert the first detection signal into the pulse signal, and the first detection signal that has been converted into the pulse signal is the detection signal indicating the rotation state of the rotator 200. On the other hand, in this embodiment, the second detection signal is a signal used as a reference to convert the first detection signal into a first pulse signal and is also a signal indicating the rotation state of the rotator 200. Further, the first detection signal is a signal used as a reference to convert the second detection signal into a second pulse signal and is also a signal indicating the rotation state of the rotator 200. Thus, the first detection signal and the second detection signal are the reference signals used to generate the two pulse signals and are also the detection signals indicating the rotation state of the rotator 200.

The processing unit 30 according to this embodiment also has the comparison units 31, 32. The first comparison unit 31 generates a first detection threshold, and compares the first detection threshold and the first detection signal. The second comparison unit 32 generates a second detection threshold, and compares the second detection threshold and the second detection signal. The first comparison unit 31 converts the first detection signal into the first pulse signal, based on the result of comparing the first detection threshold and the first detection signal and the result of comparing the second detection threshold and the second detection signal.

The second comparison unit 32 converts the second detection signal into the second pulse signal, based on the result of comparing the second detection threshold and the second detection signal and the result of comparing the first detection threshold and the first detection signal.

Figure 9:
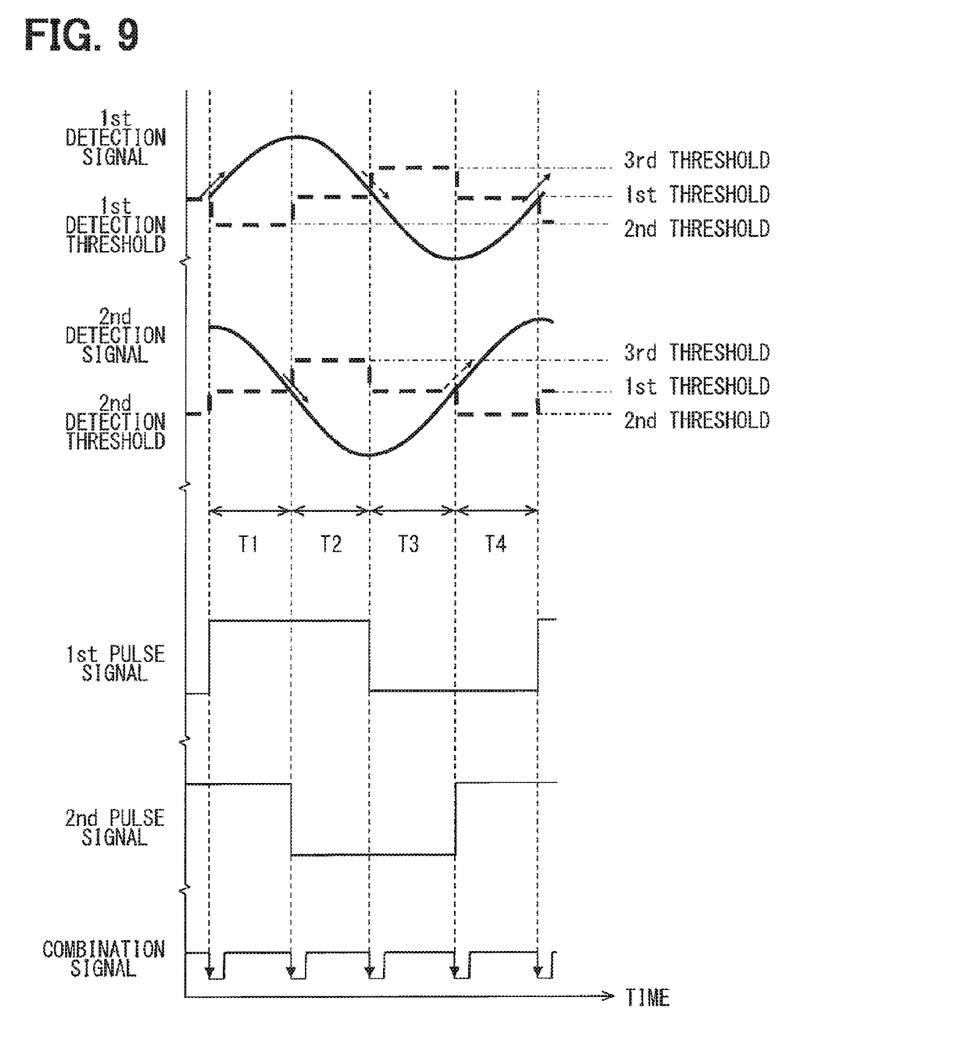
FIG. 9 is a timing chart showing detection signals, thresholds, and pulse signals in the rotation sensor.

As described above, the first detection signal and the second detection signal are triangular waves having a phase difference of 90 degrees, and if the first detection signal is a sine wave, the second detection signal is a cosine wave. The first comparison unit 31 has the first detection threshold, and the second comparison unit 32 has the second detection threshold. As shown in FIG. 9, the first detection signal acts to exceed the first detection threshold only once during a period from a time the second detection signal exceeds the second detection threshold to a time the second detection signal falls below the second detection threshold and fall below the first detection threshold only once during a period from a time the second detection signal falls below the second detection threshold to a time the second detection signal exceeds the second detection threshold. The second detection signal acts to fall below the second detection threshold only once during a period from a time the first detection signal exceeds the first detection threshold to a time the first detection signal falls below the first detection threshold and exceed the second detection threshold only once during a period from a time the first detection signal falls below the first detection threshold to a time the first detection signal exceeds the first detection threshold.

The first comparison unit 31 performs the same signal processing as in the first embodiment. That is, the first comparison unit 31 changes the voltage level of the first detection threshold when the first detection signal exceeds or falls below the first detection threshold, restores the voltage level of the first detection threshold when the second detection signal falls below or exceeds the second detection threshold only once, and again changes the voltage level of the first detection threshold when the first detection signal fails below or exceeds the first detection threshold of the same voltage level. Further, the first comparison unit 31 converts the first detection signal into the first pulse signal that has the pulse rising edge when the first detection signal exceeds the first detection threshold and has the pulse falling edge when the first detection signal falls below the first detection threshold of the same voltage level.

On the other hand, the second comparison unit 32 performs signal processing different from that in the first embodiment. That is, the second comparison unit 32 changes the voltage level of the second detection threshold when the second detection signal exceeds or falls below the second detection threshold, restores the voltage level of the second detection threshold when the first detection signal falls below or exceeds the first detection threshold only once, and changes the voltage level of the second detection threshold when the second detection signal falls below or exceeds the second detection threshold of the same voltage level. Further, the second comparison unit 32 converts the second detection signal into the second pulse signal that has the pulse rising edge when the second detection signal exceeds the second detection threshold and has the pulse falling edge when the second detection signal falls below the second detection threshold of the same voltage level.

Figure 7:
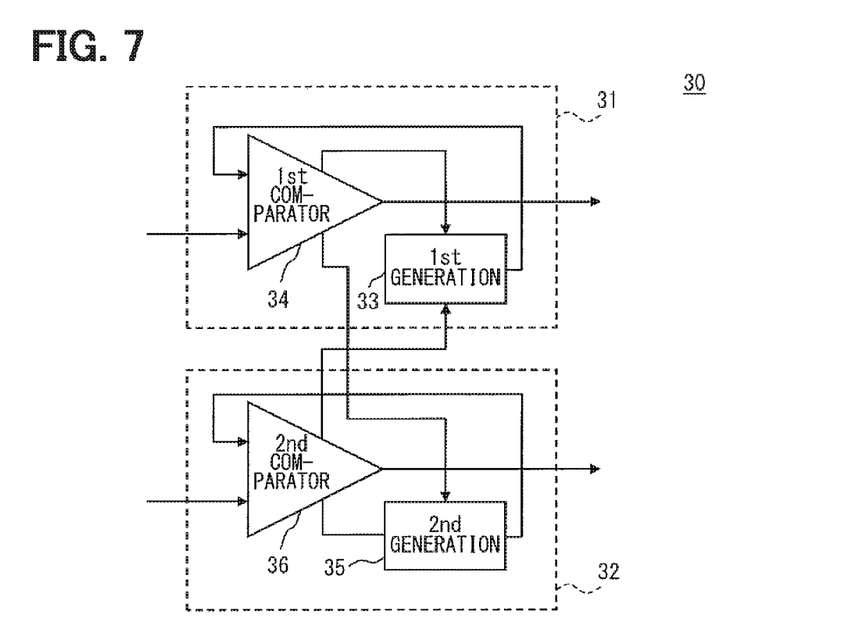
FIG. 7 is a block diagram showing a schematic configuration of a processing unit of the rotation sensor.

The comparison units 31, 32 according to this embodiment also are Schmitt trigger circuits in the concrete. As shown in FIG. 7, the first comparison unit 31 has the first generation unit 33 for generating the first detection threshold and the first comparator 34 for comparing the first detection signal and the first detection threshold. The second comparison unit 32 has the second generation unit 35 for generating the second detection threshold and the second comparator 36 for comparing the second detection signal and the second detection threshold. In this embodiment, the internal signals of not only the second comparator 36 but also of the first comparator 34 are inputted to the second generation unit 35. The second generation unit 35 adjusts the voltage level of the second detection threshold, based on these signals.

Figure 8A:
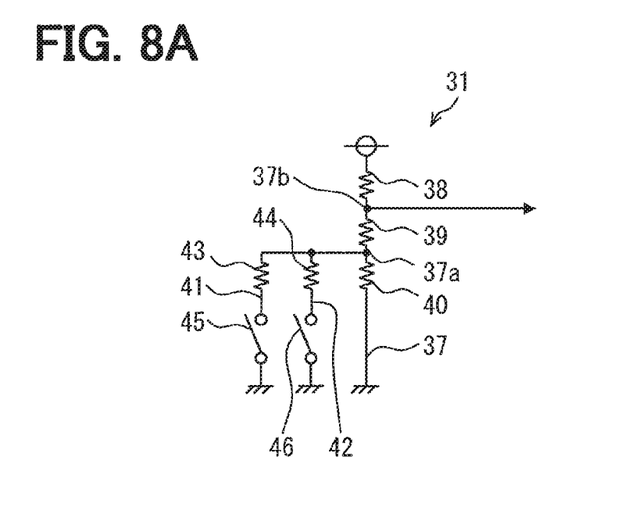
FIG. 8A is a circuit diagram showing an equivalent circuit of a first comparison unit of the processing unit.
Figure 8B:
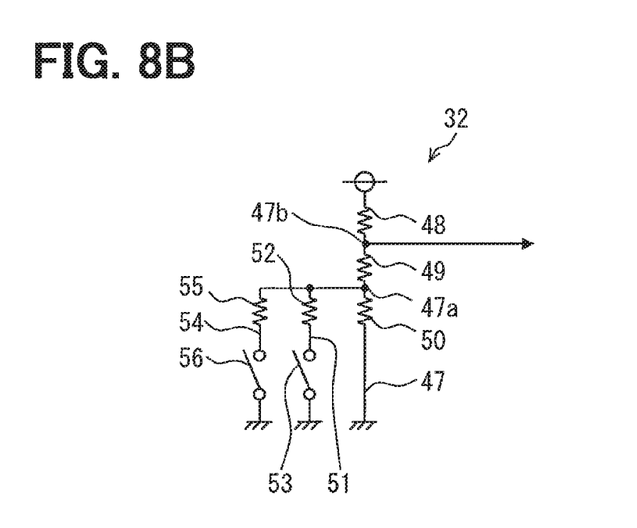
FIG. 8B is a circuit diagram showing an equivalent circuit of a second comparison unit of the processing unit.

As shown in FIG. 8A, the first comparison unit 31 has the same circuit configuration as in the first embodiment. As shown in FIG. 8B, the circuit configuration of the second comparison unit 32 is different from that of the first embodiment and the same as that of the first comparison unit 31.

That is, the second comparison unit 32 has the second power source wiring line 47 for connecting the power source and the ground and three second power source resistors 48 to 50 connected in series with the second power source wiring line 47. Further, the second comparison unit 32 has second ground wiring lines 51, 54 for connecting the third middle point 47a, located on the ground side, of the two middle points constituted by the three second power source resistors 48 to 50 and the ground and second ground resistors 52, 55 provided respectively on the second ground wiring lines 51, 54.

In the second comparison unit 32, the potential of the fourth middle point 47b, located on the power source side, of the two middle points is the second detection threshold, and the second comparison unit 32 has the third switch 53 provided on the second ground wiring line 51 and a fourth switch 56 provided on the second ground wiring line 54, as detection switches for determining the second detection threshold. The potential of the fourth middle point 47b, that is, the second detection threshold is switched in accordance with the respective driven states of the switches 53, 56.

The driven state of the fourth switch 56 is controlled in accordance with whether the voltage level of the second detection signal falls below or exceeds the second detection threshold, and the driven state of the third switch 53 is controlled in accordance with whether the voltage level of the first detection signal falls below or exceeds the first detection threshold. The second detection threshold includes a first threshold, a second threshold lower in voltage level than the first threshold, and a third threshold higher in voltage level than the first threshold.

In this embodiment, the second ground resistors 52, 55 have the same resistance value. If one of the fourth switch 56 and the third switch 53 is in the driven state and the other is in the undriven state, the second detection threshold is set to the first threshold. If both the fourth switch 56 and the third switch 53 are in the driven state, the second detection threshold is set to the second threshold. If both the fourth switch 56 and the third switch 53 are in the undriven state, the second detection threshold is set to the third threshold.

The combination unit 60 combines the first pulse signal outputted from the first comparison unit 31 and the second pulse signal outputted from the second comparison unit 32, thereby generating a combination signal. The combination signal contains pulses that have pulse falling edges or rising edges at the rising and falling edges of pulses contained in the first pulse signal and the second pulse signal and have a pulse width set to a predetermined value.

As shown in FIG. 9, in this embodiment, the pulses contained in the combination signal have falling edges at the rising and falling edges of pulses contained in the first pulse signal and the second pulse signal. The pulse width of the combination signal is determined by the rotation direction of the rotator 200, and set to a value that differs depending on whether the rotator 200 rotates in a forward direction or in a reverse direction.

The combination unit 60 calculates the rotation direction of the rotator 200 based on the first pulse signal and the second pulse signal. The combination signal generated by the combination unit 60 is outputted as a detection signal indicating the rotation state of the rotator 200 to a control circuit (not shown) which is located in the subsequent stage and controls the rotation state of the rotator 200.

Hereinafter, the respective shifts of the first detection threshold and the second detection threshold are described with reference to FIG. 9. In the initial state, the first switch 45 is in the undriven state, and the switches 46, 53, 56 are in the driven state, so that the first detection threshold is set to the first threshold, and the second detection threshold is set to the second threshold.

At the beginning of the first time period T1, the voltage level of the first detection signal exceeds the first threshold, as shown by a solid right-upward arrow in FIG. 9. The first comparison unit 31 brings the first switch 45 from the undriven state to the driven state and maintains the driven state of the second switch 46 in order to suppress a malfunction caused by noise overlapped on the first detection signal. Thus, the first detection threshold is set from the first threshold to the second threshold. Based on the comparison result of the first comparison unit 31, the second comparison unit 32 maintains the driven state of the fourth switch 56 and brings the third switch 53 from the driven state to the undriven state. Thus, the second detection threshold is set from the second threshold to the first threshold.

At the beginning of the second time period T2, the voltage level of the second detection signal falls below the first threshold, as shown by a solid right-downward arrow in FIG. 9. The second comparison unit 32 brings the fourth switch 56 from the driven state to the undriven state and maintains the undriven state of the third switch 53 in order to suppress a malfunction caused by noise overlapped on the second detection signal. Thus, the second detection threshold is set from the first threshold to the third threshold. Based on the comparison result of the second comparison unit 32, the first comparison unit 31 maintains the driven state of the first switch 45 and brings the second switch 46 from the driven state to the undriven state. Thus, the first detection threshold is reset from the second threshold to the first threshold.

At the beginning of the third time period T3, the voltage level of the first detection signal falls below the first threshold, as shown by a dashed right-downward arrow in FIG. 9. The first comparison unit 31 brings the first switch 45 from the driven state to the undriven state and maintains the undriven state of the second switch 46 in order to suppress a malfunction caused by noise overlapped on the first detection signal. Thus, the first detection threshold is set from the first threshold to the third threshold. Based on the comparison result of the first comparison unit 31, the second comparison unit 32 maintains the undriven state of the fourth switch 56 and brings the third switch 53 from the undriven state to the driven state. Thus, the second detection threshold is set from the third threshold to the first threshold.

At the beginning of the fourth time period T4, the voltage level of the second detection signal exceeds the first threshold, as shown by a dashed right-upward arrow in FIG. 9. The second comparison unit 32 brings the fourth switch 56 from the undriven state to the driven state and maintains the driven state of the third switch 53 in order to suppress a malfunction caused by noise overlapped on the second detection signal. Thus, the second detection threshold is set from the first threshold to the second threshold. Based on the comparison result of the second comparison unit 32, the first comparison unit 31 maintains the undriven state of the first switch 45 and brings the second switch 46 from the undriven state to the driven state. Thus, the first detection threshold is reset from the third threshold to the first threshold.

Further, at the end of the fourth time period T4, the voltage level of the first detection signal exceeds the first threshold, as shown by a dashed right-upward arrow in FIG. 9. The first comparison unit 31 brings the first switch 45 from the undriven state to the driven state and maintains the driven state of the second switch 46 in order to suppress a malfunction caused by noise overlapped on the first detection signal. Thus, the first detection threshold is set from the first threshold to the second threshold. Based on the comparison result of the first comparison unit 31, the second comparison unit 32 maintains the driven state of the fourth switch 56 and brings the third switch 53 from the driven state to the undriven state. Thus, the second detection threshold is set from the second threshold to the first threshold.

Then, the above-described operations are repeated in the time periods T1 to T4. Thus, as shown in FIG. 9, the first comparison unit 31 converts the first detection signal into the first pulse signal that has the pulse rising edge when the first detection signal exceeds the first threshold and has the pulse falling edge when the first detection signal falls below the first threshold. The second comparison unit 32 converts the second detection signal into the second pulse signal that has the pulse rising edge when the second detection signal exceeds the second detection threshold and has the pulse falling edge when the second detection signal falls below the second detection threshold of the same voltage level. The combination unit 60 generates the combination signal having pulse falling edges at the falling and rising edges of pulses of the first pulse signal and the second pulse signal.

Next, the operational effects of the rotation sensor 100 according to this embodiment will be described. As described above, to suppress a malfunction caused by noise overlapped on the first detection signal, the voltage level of the first detection threshold is changed when the first detection signal exceeds or falls below the first detection threshold. Further, the voltage level of the first detection threshold is restored based on the second detection signal and the second detection threshold, and the first detection signal is converted into the first pulse signal based on the first detection threshold of the same voltage level (first threshold). More specifically, the first detection signal is converted into the first pulse signal that has the pulse rising edge when the first detection signal exceeds the first threshold and has the pulse falling edge when the first detection signal falls below the first threshold.

Similarly, to suppress a malfunction caused by noise overlapped on the second detection signal, the voltage level of the second detection threshold is changed when the second detection signal exceeds or falls below the second detection threshold. Further, the voltage level of the second detection threshold is restored based on the first detection signal and the first detection threshold, and the second detection signal is converted into the second pulse signal based on the second detection threshold of the same voltage level (first threshold). More specifically, the second detection signal is converted into the second pulse signal that has the pulse rising edge when the second detection signal exceeds the first threshold and has the pulse falling edge when the second detection signal falls below the first threshold.

Thus, in the rotation sensor 100, unlike the configuration for converting the first detection signal into the first pulse signal that has the pulse rising edge when the first detection signal exceeds the first threshold and has the pulse falling edge when the first detection signal falls below the second threshold different in voltage level from the first threshold, the decrease in the accuracy of the first pulse signal is suppressed. Similarly, unlike the configuration for converting the second detection signal into the second pulse signal that has the pulse rising edge when the second detection signal exceeds the first threshold and has the pulse falling edge when the first detection signal falls below the second threshold different in voltage level from the first threshold, the decrease in the accuracy of the second pulse signal is suppressed.

Further, in comparison with the configuration for converting the first detection signal into the first pulse signal that has the pulse rising edge when the first detection signal exceeds the first threshold and has the pulse falling edge when the first detection signal again exceeds the first threshold, the number of pulses contained in the first pulse signal is increased. More specifically, the number of pulses is doubled. Similarly, in comparison with the configuration for converting the second detection signal into the second pulse signal that has the pulse rising edge when the second detection signal exceeds the first threshold and has the pulse falling edge when the second detection signal again exceeds the first threshold, the number of pulses contained in the second pulse signal is increased. More specifically, the number of pulses is doubled.

Further, in this embodiment, the combination unit 60 generates the combination signal containing pulses that have pulse falling edges at the rising and falling edges of pulses contained in the first pulse signal and the second pulse signal and have the pulse width set to the predetermined value. According to this, the number of pulses is quadrupled compared to the pulse signal in the first embodiment.

In the example of this embodiment, the first detection signal and the second detection signal are triangular waves. However, it is sufficient if the first detection signal and the second detection signal have the same waveform and have a phase difference of ±90 degrees, and the first detection signal and the second detection signal are not limited to triangular waves.

In this embodiment, the comparison units 31, 32 are Schmitt trigger circuits, and FIGS. 8A, 8B specifically show the equivalent circuits for changing the respective voltage levels of the first detection threshold and the second detection threshold; however, as a matter of course, the configuration for changing the voltage levels of the detection thresholds is not limited to this example, and the relationship among the resistance values of elements constituting the circuit is not limited. In the case of the circuit configuration shown in FIGS. 8A, 8B, the following is not limited as follows.

That is, in the example of this embodiment, the first comparison unit 31 has the three first power source resistors 38 to 40. However, the number of first power source resistors can be three or more.

In the example, the first comparison unit 31 has the two first ground wiring lines 41, 42. However, the number of first ground wiring lines can be two or more. Further, in the example, one first ground resistor is provided on one first ground wiring line. However, the number of first ground resistors provided on the first ground wiring line is not limited to the above example.

In the example of this embodiment, the second comparison unit 32 has the three second power source resistors 48 to 50. However, the number of second power source resistors can be three or more.

In the example, the second comparison unit 32 has the two second ground wiring lines 51, 54. However, the number of second ground wiring lines can be two or more. Further, in the example, one second ground resistor is provided on one second ground wiring line. However, the number of second ground resistors provided on the second ground wiring line is not limited to the above example.

In the example of this embodiment, the internal signals of not only the second comparator 36 but also of the first comparator 34 (the internal signals of the Schmitt trigger circuits) are inputted to the second generation unit 35. However, the output signals of the second comparator 36 and the first comparator 34 (the output signals of the Schmitt trigger circuits) may be inputted to the second generation unit 35. In either case, the effects of this embodiment can be obtained.

While the preferred embodiments of the present disclosure have been described, the present disclosure is not limited to the above embodiments, and various changes and modifications can be made without departing from the scope and spirit of the present disclosure.

In the example of each embodiment, the rotation state of the rotator 200 having the projections and depressions formed at equal spaces along the circumferential direction on the surface is detected. However, the rotator 200 is not limited to the above example, and for example, the rotation state of the rotator 200 having magnetic poles formed at equal spaces along the circumferential direction on the surface can be detected. In this case, magnetic flux passing through each of the magnetoelectric conversion units 11, 12 varies in accordance with the rotation of the magnetic poles. Further, in the case where the rotator 200 itself thus generates magnetic flux, the magnetic field generation unit is not necessarily required in the magnetoelectric conversion unit 10.

In the example of each embodiment, the magnetoelectric conversion units 11, 12 each have the magnetoresistance effect elements. However, the element for converting the magnetic signal into the electric signal is not limited to the above example, and for example, the Hall element can be adopted. The magnetoresistance effect element refers to GMR, TMR, and AMR having pinned and free layers.

In the example of each embodiment, the magnetoelectric conversion unit 10 has the amplification units 13, 14. However, the amplification units 13, 14 are not necessarily required.

The invention claimed is:

1. A rotation sensor that detects a rotation state of a rotator based on change of magnetic flux whose direction changes periodically with rotation of the rotator, the rotation sensor comprising:
   a magnetoelectric conversion unit that converts change of magnetic flux whose direction changes periodically into an electric signal; and
   a processing unit that processes the electric signal of the magnetoelectric conversion unit, wherein
   the magnetoelectric conversion unit outputs, as the electric signal, a first detection signal and a second detection signal having the same period and different phases,
   the processing unit has a first comparison unit that generates a detection threshold and compares the detection threshold and the first detection signal and a second comparison unit that generates a reference threshold and compares the reference threshold and the second detection signal,
   the second detection signal acts to fall below or exceed the reference threshold only once during a period from a time the first detection signal exceeds the detection threshold to a time the first detection signal falls below the detection threshold and during a period from a time the first detection signal falls below the detection threshold to a time the first detection signal exceeds the detection threshold,
   the first comparison unit changes a voltage level of the detection threshold when the first detection signal exceeds or falls below the detection threshold, restores the voltage level of the detection threshold when the second detection signal falls below or exceeds the reference threshold only once, and changes the voltage level of the detection threshold when the first detection signal falls below or exceeds the detection threshold of the same voltage level, and
   the first comparison unit converts the first detection signal into a pulse signal that has a pulse rising edge when the first detection signal exceeds the detection threshold and has a pulse falling edge when the first detection signal falls below the detection threshold of the same voltage level.

2. The rotation sensor according to claim 1, wherein
   the first comparison unit has a first threshold, a second threshold lower in voltage level than the first threshold, and a third threshold higher in voltage level than the first threshold, as the detection threshold,
   the first comparison unit sets the detection threshold from the first threshold to the second threshold when a voltage level of the first detection signal exceeds the first threshold,
   the first comparison unit sets the detection threshold from the second threshold to the first threshold when a voltage level of the second detection signal falls below or exceeds the reference threshold,
   the first comparison unit sets the detection threshold from the first threshold to the third threshold when the voltage level of the first detection signal falls below the first threshold,
   the first comparison unit sets the detection threshold from the third threshold to the first threshold when the voltage level of the second detection signal exceeds or falls below the reference threshold, and thereby
   the first comparison unit converts the first detection signal into the pulse signal that has the pulse rising edge when the first detection signal exceeds the first threshold and has the pulse falling edge when the first detection signal falls below the first threshold.

3. The rotation sensor according to claim 2, wherein
   the first comparison unit has detection switches that determine the detection threshold,
   the detection switches include a first switch and a second switch,
   a driven state of the first switch is controlled in accordance with whether the voltage level of the first detection signal falls below or exceeds the detection threshold, and
   a driven state of the second switch is controlled in accordance with whether the voltage level of the second detection signal falls below or exceeds the reference threshold.

4. The rotation sensor according to claim 3, wherein
   the first comparison unit has:
   a first power source wiring line that connects a power source and a ground;
   at least three first power source resistors connected in series with the first power source wiring line;
   a plurality of first ground wiring lines that connect a middle point, located adjacent to the ground, of at least two middle points constituted by at least the three first power source resistors and the ground; and
   first ground resistors provided respectively on the first ground wiring lines,
   a potential of a middle point, located adjacent to the power source, of at least the two middle points is the detection threshold,
   the first switch is provided on one of the first ground wiring lines, and
   the second switch is provided on a first ground wiring line different from the first ground wiring line where the first switch is provided.

5. The rotation sensor according to claim 2, wherein
   the second comparison unit has a fourth threshold and a fifth threshold higher in voltage level than the fourth threshold, as the reference threshold, and has a reference switch that determines the reference threshold, and
   a driven state of the reference switch is controlled in accordance with whether the voltage level of the second detection signal falls below or exceeds the reference threshold.

6. The rotation sensor according to claim 5, wherein
   the second comparison unit has:
   a second power source wiring line that connects the power source and the ground;
   at least three second power source resistors connected in series with the second power source wiring line;
   a second ground wiring line that connects a middle point, located adjacent to the ground, of at least two middle points constituted by at least the three second power source resistors and the ground; and
   a second ground resistor provided on the second ground wiring line,
   a potential of a middle point, located adjacent to the power source, of at least the two middle points is the reference threshold, and the reference switch is provided on the second ground wiring line.

7. The rotation sensor according to claim 1, wherein the first detection signal and the second detection signal have the same amplitude and waveform.

8. The rotation sensor according to claim 7, wherein the first detection signal and the second detection signal are triangular waves.

9. The rotation sensor according to claim 8, wherein the first detection signal and the second detection signal have a phase difference of 90 degrees.

10. A rotation sensor that detects a rotation state of a rotator based on change of magnetic flux whose direction changes periodically with rotation of the rotator, the rotation sensor comprising:

a magnetoelectric conversion unit that converts change of magnetic flux whose direction changes periodically into an electric signal; and a processing unit that processes the electric signal of the magnetoelectric conversion unit, wherein the magnetoelectric conversion unit outputs, as the electric signal, a first detection signal and a second detection signal having the same waveform and amplitude and having a phase difference of 90 degrees, the processing unit has a first comparison unit that generates a first detection threshold and compares the first detection threshold and the first detection signal, a second comparison unit that generates a second detection threshold and compares the second detection threshold and the second detection signal, and a combination unit that combines respective signals outputted from the first comparison unit and the second comparison unit, the second detection signal acts to fall below or exceed the second detection threshold only once during a period from a time the first detection signal exceeds the first detection threshold to a time the first detection signal falls below the first detection threshold and during a period from a time the first detection signal falls below the first detection threshold to a time the first detection signal exceeds the first detection threshold, the first comparison unit changes a voltage level of the first detection threshold when the first detection signal exceeds or falls below the first detection threshold, restores the voltage level of the first detection threshold when the second detection signal falls below or exceeds the second detection threshold only once, and changes the voltage level of the first detection threshold when the first detection signal falls below or exceeds the first detection threshold of the same voltage level, the first comparison unit converts the first detection signal into a first pulse signal that has a pulse rising edge when the first detection signal exceeds the first detection threshold and has a pulse falling edge when the first detection signal falls below the first detection threshold of the same voltage level, the first detection signal acts to exceed or fall below the first detection threshold only once during a period from a time the second detection signal exceeds the second detection threshold to a time the second detection signal falls below the second detection threshold and during a period from a time the second detection signal falls below the second detection threshold to a time the second detection signal exceeds the second detection threshold, the second comparison unit changes a voltage level of the second detection threshold when the second detection signal exceeds or falls below the second detection threshold, restores the voltage level of the second detection threshold when the first detection signal falls below or exceeds the first detection threshold only once, and changes the voltage level of the second detection threshold when the second detection signal falls below or exceeds the second detection threshold of the same voltage level, the second comparison unit converts the second detection signal into a second pulse signal that has a pulse rising edge when the second detection signal exceeds the second detection threshold and has a pulse falling edge when the second detection signal falls below the second detection threshold of the same voltage level, and the combination unit generates a combination signal containing pulses that have pulse falling edges or rising edges at rising and falling edges of pulses contained in the first pulse signal and the second pulse signal and have a pulse width set to a predetermined value.

11. The rotation sensor according to claim 10, wherein the first comparison unit has a first threshold, a second threshold lower in voltage level than the first threshold, and a third threshold higher in voltage level than the first threshold, as the first detection threshold, the first comparison unit sets the first detection threshold from the first threshold to the second threshold when a voltage level of the first detection signal exceeds the first threshold, the first comparison unit sets the first detection threshold from the second threshold to the first threshold when a voltage level of the second detection signal falls below or exceeds the second detection threshold, the first comparison unit sets the first detection threshold from the first threshold to the third threshold when the voltage level of the first detection signal falls below the first threshold, the first comparison unit sets the first detection threshold from the third threshold to the first threshold when the voltage level of the second detection signal exceeds or falls below the second detection threshold, and thereby the first comparison unit converts the first detection signal into the first pulse signal.

12. The rotation sensor according to claim 11, wherein the first comparison unit has first detection switches that determine the first detection threshold, the first detection switches include a first switch and a second switch, a driven state of the first switch is controlled in accordance with whether the voltage level of the first detection signal falls below or exceeds the first detection threshold, and a driven state of the second switch is controlled in accordance with whether the voltage level of the second detection signal falls below or exceeds the second detection threshold.

13. The rotation sensor according to claim 12, wherein the first comparison unit has:

a first power source wiring line that connects a power source and a ground;

at least three first power source resistors connected in series with the first power source wiring line;

a plurality of first ground wiring lines that connect a middle point, located adjacent to the ground, of at least two middle points constituted by at least the three first power source resistors and the ground; and first ground resistors provided respectively on the first ground wiring lines, a potential of a middle point, located adjacent to the power source, of at least the two middle points is the first detection threshold, the first switch is provided on one of the first ground wiring lines, and the second switch is provided on a first ground wiring line different from the first ground wiring line where the first switch is provided.

14. The rotation sensor according to claim 10, wherein the second comparison unit has a first threshold, a second threshold lower in voltage level than the first threshold, and a third threshold higher in voltage level than the first threshold, as the second detection threshold, the second comparison unit sets the second detection threshold from the first threshold to the third threshold when the voltage level of the second detection signal falls below the first threshold, the second comparison unit sets the second detection threshold from the third threshold to the first threshold when the voltage level of the first detection signal falls below or exceeds the second detection threshold, the second comparison unit sets the second detection threshold from the first threshold to the second threshold when the voltage level of the second detection signal exceeds the first threshold, the second comparison unit sets the second detection threshold from the second threshold to the first threshold when the voltage level of the first detection signal exceeds or falls below the first detection threshold, and thereby the second comparison unit converts the second detection signal into the second pulse signal.

15. The rotation sensor according to claim 14, wherein the second comparison unit has second detection switches that determine the second detection threshold, the second detection switches include a third switch and a fourth switch, a driven state of the third switch is controlled in accordance with whether the voltage level of the second detection signal falls below or exceeds the second detection threshold, and a driven state of the fourth switch is controlled in accordance with whether the voltage level of the first detection signal falls below or exceeds the first detection threshold.

16. The rotation sensor according to claim 15, wherein the second comparison unit has:

a second power source wiring line that connects the power source and the ground;

at least three second power source resistors connected in series with the second power source wiring line;

a plurality of second ground wiring lines that connect a middle point, located adjacent to the ground, of at least two middle points constituted by at least the three second power source resistors and the ground; and second ground resistors provided respectively on the second ground wiring lines, a potential of a middle point, located adjacent to the power source, of at least the two middle points is the second detection threshold, the third switch is provided on one of the second ground wiring lines, and the fourth switch is provided on a third ground wiring line different from the second ground wiring line where the third switch is provided.

17. The rotation sensor according to claim 10, wherein the first detection signal and the second detection signal are triangular waves.

* * * * *